United States Patent
Singer et al.

(10) Patent No.: US 10,903,534 B2
(45) Date of Patent: Jan. 26, 2021

(54) BATTERY PACK CAPACITY OPTIMIZATION VIA SELF-REGULATION OF CELL TEMPERATURE

(71) Applicant: INTERNATIONAL BUSINESS MACHINES CORPORATION, Armonk, NY (US)

(72) Inventors: Noah Singer, New City, NY (US); Steven J. Ahladas, Highland, NY (US); Xiaojin Wei, Poughkeepsie, NY (US); Robert K. Mullady, Highland, NY (US); Michael T. Peets, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 44 days.

(21) Appl. No.: 15/997,908

(22) Filed: Jun. 5, 2018

(65) Prior Publication Data

US 2019/0372179 A1     Dec. 5, 2019

(51) Int. Cl.
*H01M 10/615* (2014.01)
*H01M 10/65* (2014.01)
(Continued)

(52) U.S. Cl.
CPC ........... *H01M 10/615* (2015.04); *B60L 58/27* (2019.02); *H01M 10/0525* (2013.01);
(Continued)

(58) Field of Classification Search
CPC ............. H01M 10/615; H01M 10/613; H01M 10/625; H01M 10/0525; H01M 10/633; H01M 10/65; B60L 58/27; H02J 7/007
(Continued)

(56) References Cited

U.S. PATENT DOCUMENTS 3,863,077 A * 1/1975 Bienkowski .......... F02N 11/105
290/38 R
3,893,428 A * 7/1975 Markus .................. F02B 53/10
123/206

(Continued)

FOREIGN PATENT DOCUMENTS

JP       2017022928 A      1/2017

OTHER PUBLICATIONS

Mel, et al., "The NIST Definition of Cloud Computing," National Institute of Standards and Technology, Information Technology Laboratory, Special Publication 800-145, Sep. 2011, (pp. 1-7).

*Primary Examiner* — M Baye Diao
(74) *Attorney, Agent, or Firm* — Tihon Poltavets, Esq.; Kevin P. Radigan, Esq.; Heslin Rothenberg Farley & Mesiti P.C.

(57) ABSTRACT

Managing of battery pack cell capacity is provided. The managing includes monitoring temperature of one or more cells within the battery pack, and based on temperature of a cell of the one or more cells being at or below a low temperature threshold, initiating discharging of cells with the battery pack at a specified discharge power level to heat the cells within the battery pack. The managing also includes, based on temperature of a cell of the one or more cells rising to or above an upper temperature threshold after initiating discharging of the cells within the battery pack, discontinuing the discharging of cells within the battery pack.

20 Claims, 13 Drawing Sheets

(51) Int. Cl.
*H01M 10/633* (2014.01)
*H01M 10/0525* (2010.01)
*H02J 7/00* (2006.01)
*H01M 10/625* (2014.01)
*H01M 10/613* (2014.01)
*B60L 58/27* (2019.01)

(52) U.S. Cl.
CPC ....... *H01M 10/613* (2015.04); *H01M 10/625* (2015.04); *H01M 10/633* (2015.04); *H01M 10/65* (2015.04); *H02J 7/007* (2013.01)

(58) Field of Classification Search
USPC .......................................................... 320/153
See application file for complete search history.

(56) References Cited

U.S. PATENT DOCUMENTS

| | | | | |
|---|---|---|---|---|
| 4,567,476 | A * | 1/1986 | Lang | G01R 19/16542 340/636.15 |
| 5,146,095 | A * | 9/1992 | Tsuchiya | F02N 11/0866 290/38 R |
| 5,362,942 | A | 11/1994 | Vanderslice, Jr. et al. | |
| 5,444,595 | A * | 8/1995 | Ishikawa | H03K 3/0231 361/86 |
| 5,446,365 | A * | 8/1995 | Nomura | B60L 7/12 320/128 |
| 5,795,664 | A | 8/1998 | Kelly | |
| 6,002,240 | A | 12/1999 | McMahan et al. | |
| 6,408,968 | B1 * | 6/2002 | Wakashiro | B60W 10/06 180/65.26 |
| 6,484,707 | B1 * | 11/2002 | Frus | F02P 3/02 123/597 |
| 6,937,484 | B2 * | 8/2005 | Nakamura | H02M 1/36 363/36 |
| 7,615,969 | B2 | 11/2009 | Meng et al. | |
| 7,963,264 | B2 * | 6/2011 | Reynolds | F02N 11/087 123/179.3 |
| 8,076,908 | B2 * | 12/2011 | Przywecki | H02J 7/345 320/167 |
| 8,179,103 | B2 * | 5/2012 | Doljack | H02J 7/345 320/166 |
| 8,450,966 | B2 | 5/2013 | Krauer et al. | |
| 9,156,356 | B2 * | 10/2015 | Rini | B60L 58/15 |
| 9,300,018 | B2 * | 3/2016 | Watson | H01M 10/441 |
| 9,340,121 | B2 | 5/2016 | Schwarz et al. | |
| 9,627,720 | B2 | 4/2017 | Yun | |
| 9,640,843 | B2 | 5/2017 | Horito et al. | |
| 9,673,648 | B2 | 6/2017 | Johnson et al. | |
| 10,099,562 | B2 * | 10/2018 | Jin | G01R 31/382 |
| 10,367,239 | B1 * | 7/2019 | Dao | H01M 2/1077 |
| 10,468,900 | B2 | 11/2019 | Dai et al. | |
| 10,547,184 | B2 | 1/2020 | Carralero et al. | |
| 2003/0042742 | A1 * | 3/2003 | Shimizu | H02P 9/04 290/41 |
| 2004/0120167 | A1 * | 6/2004 | Nakamura | H02P 9/08 363/37 |
| 2005/0074666 | A1 * | 4/2005 | Kimiya | H01M 10/637 429/62 |
| 2008/0079389 | A1 * | 4/2008 | Howell | H02J 7/1438 320/104 |
| 2010/0090527 | A1 * | 4/2010 | Tarnowsky | H01M 10/443 307/10.7 |
| 2012/0037438 | A1 * | 2/2012 | Schultz | B60L 50/40 180/65.22 |
| 2012/0098543 | A1 | 4/2012 | Rutkowski et al. | |
| 2012/0112695 | A1 * | 5/2012 | Nishi | B60L 58/34 320/109 |
| 2014/0269811 | A1 * | 9/2014 | Maleki | G01K 13/00 374/1 |
| 2015/0122008 | A1 * | 5/2015 | Shimizu | H02J 7/007 73/170.28 |
| 2016/0043447 | A1 * | 2/2016 | Peh | H02J 7/0013 320/112 |
| 2016/0276715 | A1 * | 9/2016 | Kajitani | H01G 11/18 |
| 2017/0025869 | A1 * | 1/2017 | Lundholm | H02J 7/0013 |
| 2017/0098874 | A1 * | 4/2017 | Shen et al. | H01M 10/6571 |
| 2017/0201112 | A1 * | 7/2017 | Liu | H01M 10/615 |
| 2019/0039477 | A1 * | 2/2019 | Ohgaki | B60L 58/12 |
| 2019/0252742 | A1 * | 8/2019 | Liu | H01M 10/637 |
| 2019/0372179 | A1 * | 12/2019 | Singer | H01M 10/615 |

\* cited by examiner

BATTERY PACK CAPACITY OPTIMIZATION VIA SELF-REGULATION OF CELL TEMPERATURE

BACKGROUND

Lithium-ion batteries are one type of battery of a wide variety of batteries available for use as an energy source, including as a backup energy source. Lithium-ion batteries are rechargeable batteries in which lithium-ions move from a negative electrode to a positive electrode during discharge and back when charging. An intercalated lithium compound is used in a lithium-ion battery as one electrode material. The electrolyte, which allows for ionic movement, and the two electrodes are the constituent components of a lithium-ion battery cell. A cell is a basic electrochemical unit that contains the electrodes, separator and electrolyte. A battery or battery pack is a collection of cells or cell assemblies. These may be ready for use by providing an appropriate housing, and electrical interconnections.

Battery cell performance is dependent on temperature. The same battery cell may have significantly more or less capacity available depending on the temperature of the cell. Typically, battery packs which are required to operate at lower temperatures are over designed with extra cells to account for lost capacity at lower temperatures, which increases the cost, complexity and weight of the pack.

SUMMARY

Certain shortcomings of the prior art are overcome and additional advantages are provided through the provision of a method of managing battery pack cell capacity. The method includes monitoring temperature of one or more cells within a battery pack, and based on temperature of a cell of the one or more cells being at or below a low temperature threshold, initiating discharging of cells within the battery pack at a specified discharge power level to heat the cells within the battery pack. The method also includes, based on temperature of a cell of the one or more cells rising to or above an upper temperature threshold after initiating discharging of cells within the battery pack, discontinuing the discharging of cells within the battery pack.

In another aspect, a system for managing battery pack cell capacity is provided. They system includes a memory, and a processor communicatively coupled to the memory. They system performs a method, which includes monitoring temperature of one or more cells within a battery pack, and based on temperature of a cell of the one or more cells being at or below a low temperature threshold, initiating discharging of cells within the battery pack at a specified discharge power level to heat the cells within the battery pack. Further, the method includes, based on temperature of a cell of the one or more cells rising to or above an upper temperature threshold after initiating discharging cells within the battery pack, discontinuing the discharging of cells within the battery pack.

In a further aspect, a computer program product is provided for managing battery pack cell capacity. The computer program product includes a computer readable storage medium having program instructions embodied therewith. The program instructions are executable by a processor to cause the processor to: monitor temperature of one or more cells within a battery pack; based on temperature of a cell of the one or more cells being at or below a low temperature threshold, initiate discharging of cells within the battery pack at a specified discharge power level to heat the cells within the battery pack; and based on temperature of a cell of the one or more cells rising to or above an upper temperature threshold after initiating discharging of cells within the battery pack, discontinue the discharging of cells within the battery pack.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
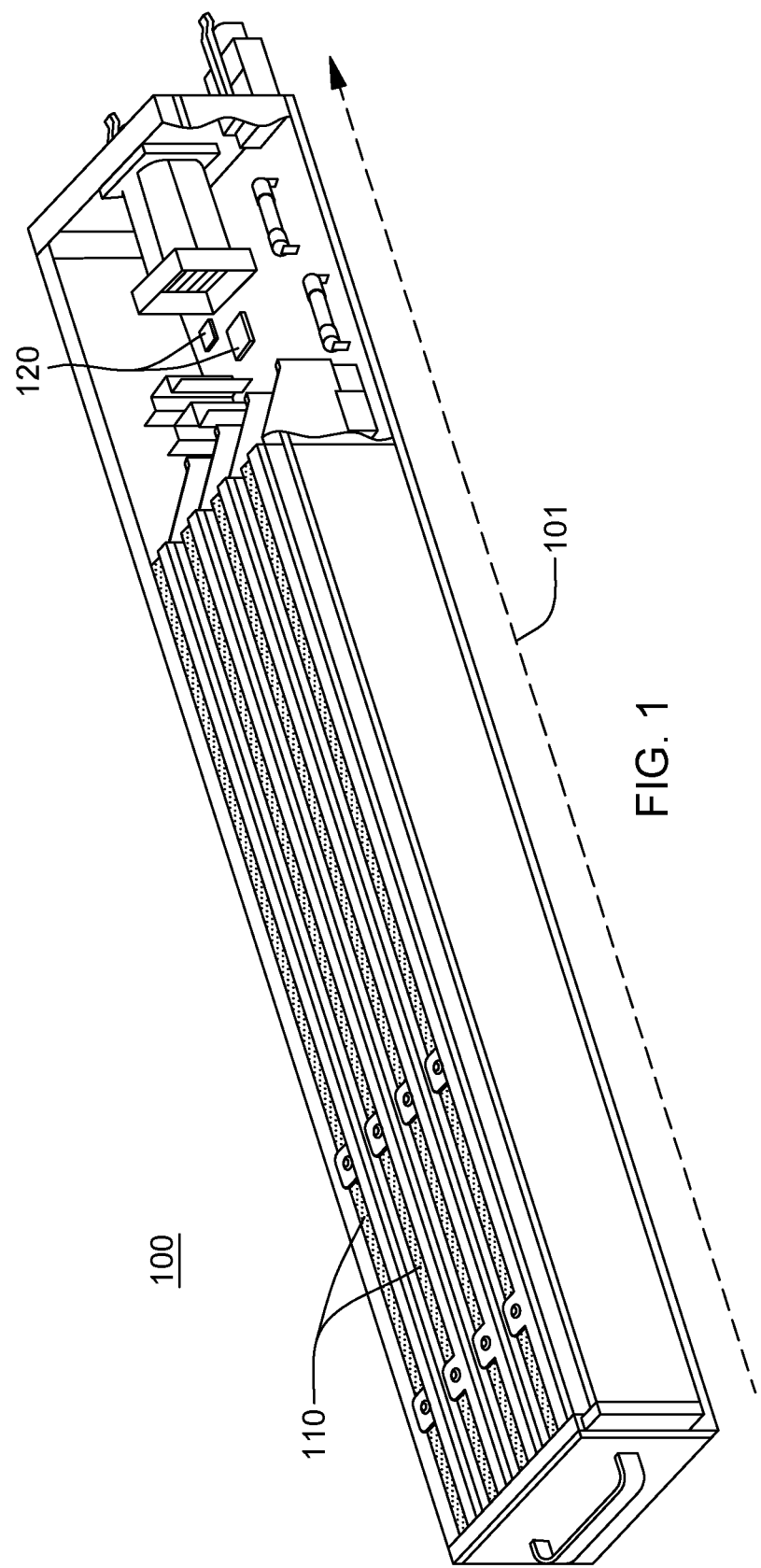
FIG. 1 depicts one embodiment of a battery pack, or battery, with battery cell capacity management, in accordance with one or more aspects of the present invention.

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description in this specific example(s), while indicating aspects of the invention, is given by way of illustration only, and not by way of limitation. Various substitutions, modifications, additions, and/or other arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application to facilitate, for instance, automated managing of battery pack cell capacity.

The illustrative embodiments may be described below using specific code, designs, architectures, protocols, layouts, schematics, or tools only as examples, and are not limited to the illustrative embodiments. Furthermore, the illustrative embodiments may be described in certain instances using particular software, tools, and data processing environments only as example for clarity of description. The illustrative embodiments may be used in conjunction with other comparable or similarly purposed structures, systems, applications, or architectures. An illustrative management control embodiment may be implemented in hardware, software, or a combination thereof.

The examples in this disclosure are used only for clarity of description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed herein.

By way of example only, a data center installation, such as an air-cooled computer room or data center, may include computing (or information technology (IT)) racks disposed within rows in the data center installation. In an air-cooled data center installation, cooling is typically in a front-to-back cooling approach. Namely, according to this approach, cooled air is drawn in through a front (air inlet side) of each rack, and hot air is exhausted from a back (air outlet side) of each rack. The cooled air drawn into the front of the rack may be supplied to air inlets of the computing components (e.g., servers) disposed within the racks. The cooled air, which may be provided through one or more perforated tiles into cold air aisles of the data center, may be drawn into the computing racks, heated and subsequently exhausted into the data center via one or more air outlets of the individual racks into hot air aisles of the data center.

The pervasive trend of increasing heat flux and power dissipation of information technology (IT) equipment continues to present a significant challenge to air-cooled data center facilities, which can contain as many as several thousand pieces of IT equipment. Typically, a data center may be rated to operate in the range of 5-40° C., to be compliant with the American Society of Heating, Refrigerating and Air-conditioning Engineers (ASHRAE) A3 standard for data center operation. Normally, customers do not operate a data center at the lower end of this temperature range, however, the components within the computing racks, including each battery backup pack must be designed to operate within the full specified temperature range. Since battery cell performance is dependent on temperature, the same battery cell may have significantly more or less capacity available depending on the current temperature of the cell. Typically, battery packs which are required to potentially operate at lower temperatures may be over designed with additional battery cells to provide the needed capacity at the lower temperatures. This overdesign essentially penalizes all customers with additional cost in order to satisfy those customers who might actually operate their data centers at the lower temperature for part of the year.

There are a wide variety of batteries available for use as energy sources, including as backup energy sources. Currently, lithium-ion batteries are a popular type of rechargeable battery for many applications. The available battery cell capacity, particularly for lithium-ion battery cells, is significantly less at lower temperatures. For instance, battery cell capacity may be approximately four times greater at 30° C., than 10° C., and thus, the conventional need to overdesign each backup battery pack with extra battery cells to provide the needed capacity at the lower temperatures.

Disclosed herein are certain novel processes to maintain battery pack cells within an acceptable or desirable temperature range for optimized performance, thereby avoiding the need to overdesign the battery pack to account for reduced cell capacity at lower temperatures. The approaches disclosed herein use the battery pack's own internal properties to maintain the battery pack cells within an optimal temperature range. When battery cells discharge, the cells heat up due to internal resistance (ESR). By periodically discharging the cells, for example, at low power/current when temperature falls below an acceptable lower threshold, the cells can be maintained within a desired temperature range, thus maintaining the battery cell capacity in an optimum range.

Disclosed herein, in one or more aspects are methods, systems and computer program products which facilitate managing battery pack cell capacity. By way of example, the managing method may include monitoring temperature of one or more cells within a battery pack, and based on temperature of a cell of the one or more cells being at or below a low temperature threshold, initiating discharging of cells within the battery pack at a specified discharge power level to heat the cells within the battery pack. Note in this regard that temperature of each cell in the battery pack may be monitored, or all the cells, or a subset of all the cells in the battery pack may be monitored. For instance, every other cell or every third cell may be monitored. Further, the method may include, based on temperature of a cell of the one or more cells rising to or above an upper temperature threshold after initiating discharging of cells within the battery pack, discontinuing the discharging of cells within the batter pack. Note that the cell which drops to or below the low temperature threshold may be the same or a different cell than the cell that rises to or above the upper temperature threshold. For instance, a first monitored cell of the battery pack may drop to or below the low temperature threshold, initiating the discharging, while a second monitored cell of the battery pack rises to or above the upper temperature threshold, resulting in discontinuing of the charging.

In one or more embodiments, the method may further include specifying the discharge power level to minimize negative effect on battery pack life. This specifying may include selecting the discharge power level based on evaluating discharge time, depth of discharge and charge time of multiple discharge power levels on cells within the battery pack. For instance, the specifying may further include selecting the discharge power level from multiple discharge power levels to maximize a number of allowable cold hours per given time frame, such as per year, below the low temperature threshold without significantly impacting life of the battery cells.

In one or more embodiments, the method may include monitoring ambient temperature about the battery pack, and based on the ambient temperature being at or below a low ambient temperature threshold, determining whether temperature of any cell of the one or more cells being monitored is below the low temperature threshold. Note in this regard that the low ambient temperature threshold may be the same or a different threshold then the low temperature threshold of a cell of the one or more cells used to initiate discharging of cells within the battery pack at the specified discharge power level. Further, in one or more embodiments, the method may include, based on the discontinuing of the discharging of cells within the battery pack, charging the cells within the battery pack where the battery pack is connected to a power source, and upon completion of the charging of the cells within the battery pack, repeating the monitoring, discharging, discontinuing of discharging and charging to maintain battery pack cell temperature within a desired operational range while the ambient temperature remains at or below the low ambient temperature threshold.

In one or more implementations, the method may further include receiving an indication that the battery pack may be used within a set time interval, for instance, within the next 30 minutes or less, and based on receiving the indication, beginning the monitoring of cell temperature of the one or more cells within the battery pack, and the initiating discharging of cells within the battery pack based on temperature of a cell of the one or more cells being at or below the low temperature threshold. In one or more embodiments, the method may further include, based on the discontinuing of the discharging of the cells within the battery pack, charging the cells within the battery pack where the battery pack is connected to a power source, and upon completion of the charging of the cells within the battery pack, repeating the monitoring, discharging, discontinuing of discharging and charging to maintain battery pack cell temperature within a desired operational temperature range for the time interval.

In one or more implementations, the method may further include determining whether battery cell capacity may be optimized based on charge within the battery cells, and wherein initiating discharging may further be based on determining that battery cell capacity may be optimized based on the charge within the battery cells. In one or more embodiments, the method may include determining during the discharging of cells within the battery pack, whether sufficient charge remains within the battery cells for continued optimization, and based on sufficient charge remaining, continuing with discharging of power at the selected discharging power level until at least one cell of the one or more cells rises to or above the upper temperature threshold, or until insufficient charge remains within the battery cells for continued optimization, and based thereon, discontinuing the discharging of the cells within the battery pack.

FIG. 1 depicts one embodiment of a battery pack system 100 including multiple battery cells 110 and associated components 120 configured as, for instance, a battery pack backup to provide standby power to one or more computing components of a computing or information technology (IT) rack for at least a specified period of time upon loss of main power. Depending on the implementation, a computing rack may include a number of battery pack backup systems, such as battery pack system 100 of FIG. 1, with each pack including a potentially large number of battery cells. As noted, when employed in a computing rack, a cooling airflow 101 is typically provided through the rack to facilitate cooling of the computing components disposed within the rack, including, for instance, the battery pack backup system(s). In one or more embodiments, the battery cells employed in the batter pack are assumed to be rechargeable battery cells, such as rechargeable lithium-ion battery cells, by way of example. Components 120 may include, in part, any conventional components associated with the battery pack system to facilitate, for instance, charging or discharging of the battery cells when appropriate to provide, for instance, backup power to one or more components within the computing rack, as well as, in part, to control and monitor components to implement one or more of the aspects disclosed herein.

Note that the battery pack system embodiment of FIG. 1 is presented by way of example only. Rechargeable battery packs are used in a wide variety of products, including in backup or standby applications, standby and/or standalone applications, as well as standalone applications. In a backup or standby application, the battery pack is generally connected to a power source via a charger, and there is typically no time constraint on managing battery pack cell capacity, and processing is fully sustainable. Examples include various backup power systems, such as that depicted in FIG. 1 for a data center computing rack. In a standby and/or standalone application, the battery pack may be connected at different times to a power source across a charger, such as may be the case with an electric vehicle or electric forklift, by way of example. At other times, the battery pack is unconnected to the power source, such as when the electric vehicle or forklift is in use. In a standalone application, the battery pack may not be connected to a charger most of the time, such as in the case of a mobile phone or a laptop computing device. In such cases, managing battery pack cell capacity may include balancing optimizing capacity by heating of the battery cells with the remaining battery charge or life, as explained herein.

Figure 2:
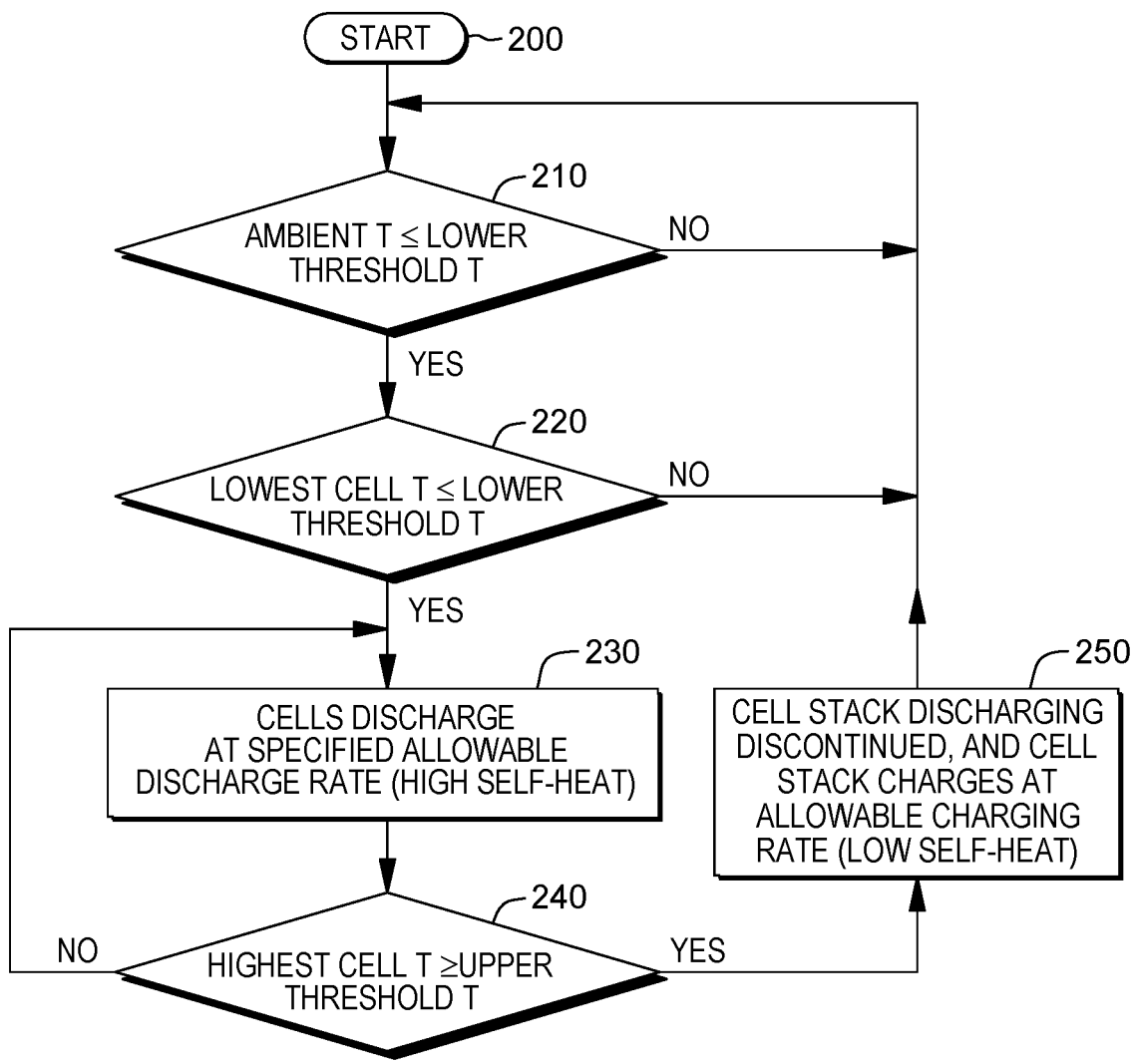
FIG. 2 depicts one embodiment of logic for managing battery cell capacity, in accordance with one or more aspects of the present invention.

By way of example, FIG. 2 depicts one embodiment of logic for managing battery pack cell capacity in a standby or backup application, in accordance with one or more aspects of the present invention. The logic begins 200 with determining whether ambient temperature (T) is less than or equal to a low ambient temperature threshold 210. If not, then battery pack cell temperature is assumed to be above a low temperature threshold at which action may need to be taken to manage the battery pack cell capacity.

Once ambient temperature is below the low ambient temperature threshold, then (in one or more embodiments) logic determines whether temperature of a lowest temperature cell of one or more battery cells being monitored is at or below a low temperature threshold 220. If not, then processing loops back to determine whether the ambient temperature about or within the battery pack system is still below the low ambient temperature threshold. Note that an appropriate delay interval may be inserted into this return process, if desired.

Once one of the monitored cells is at or below the low temperature threshold, then discharging of the battery pack cells to the load is initiated at a specified, allowable discharge rate 230. This discharge provides a high level of self-heating of the battery pack cells, which raises the temperature of the cells back to the desired operational range, that is, to a temperature above the low temperature threshold. The allowable discharge rate may be the maximum safe discharge rate specified by a manufacturer of the specific battery cell, or a lower rate. The allowable charge rate is the maximum safe charge rate specified by the manufacturer of the battery cell, which is usually significantly lower than the discharge rate. The allowable discharge rate specifies the maximum value that the actual discharge power level can be. The discharge power level can be any value from zero to the allowable discharge rate.

While discharging the battery cells to the actual load, logic may also be monitoring for temperature of a cell of the one or more cells to rise to or above an upper temperature threshold 240. In one or more implementations, the discharging continues until one of the cells being monitored is at or above this upper temperature threshold. As noted, the battery pack cell initially having the lowest temperature at or below the low temperature threshold, may be a same or a different cell, in this logic flow, than the battery cell having the highest temperature that is at or above the upper temperature threshold. Once one or more of the cells being monitored is at or above the upper temperature threshold, then the logic discontinues the discharging of cells within the battery pack, and beings charging of the cells at an allowable charging rate 250, which provides a further, low level of self-heating of the battery cells. For instance, the low level self-heating of the battery cells during charging may be $\frac{1}{100}$ the rate of self-heating during discharging of the cells. This process may repeat for the length of time that the ambient temperature is at or below the lower ambient temperature threshold.

Figure 3:
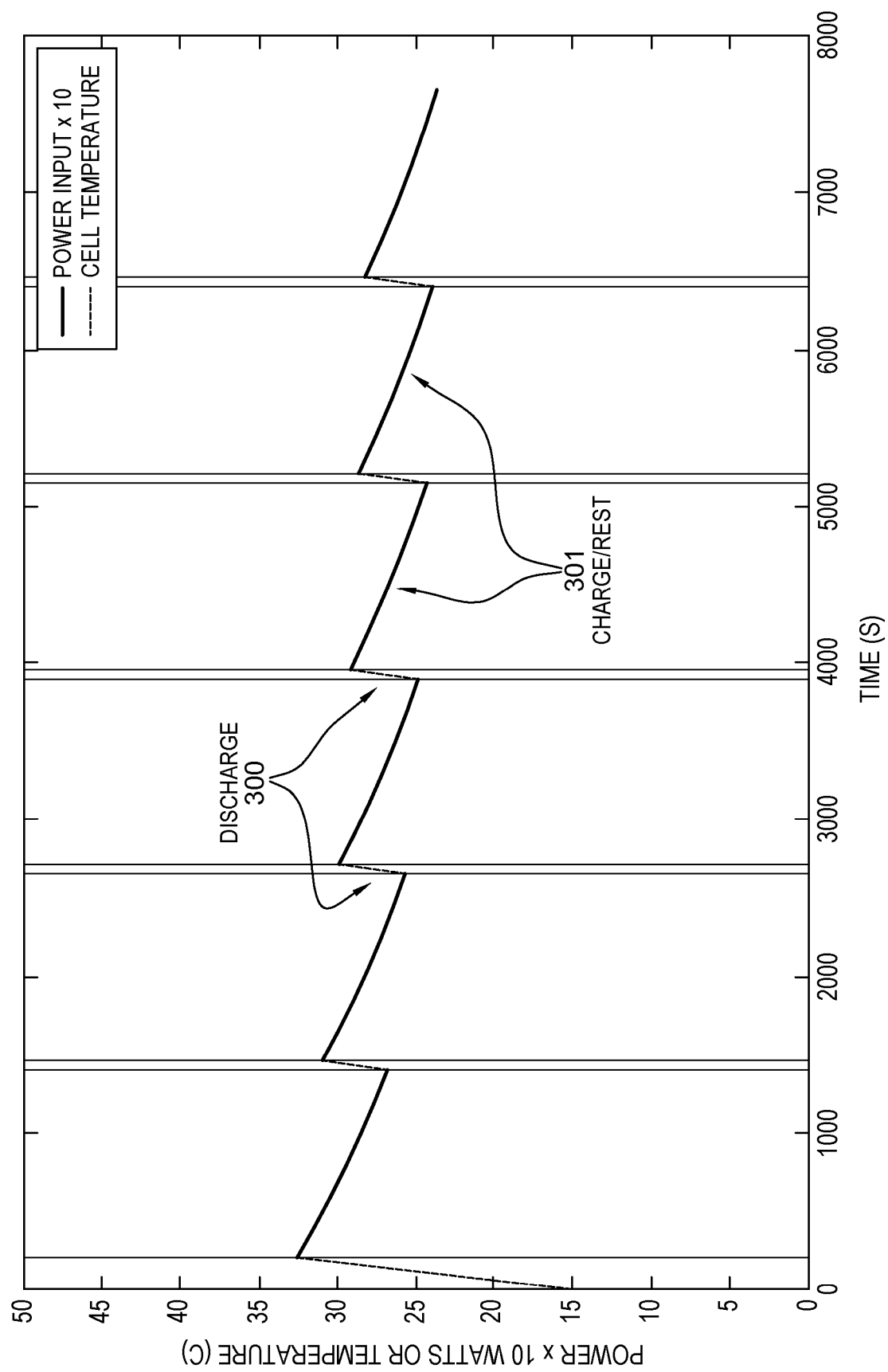
FIG. 3 graphically depicts one embodiment of battery cell temperature change with discharging and charging of the battery cell, which is to be used in accordance with one or more aspects of the present invention.

The effect of the process of FIG. 2 is depicted in the example of FIG. 3, where a stack of battery cells is desired to be maintained, for instance, in the range of 25-35° C. At the start of processing, a battery cell may be detected at a lower temperature of, for instance, 15° C., which initiates heating by cell discharge at a specified discharge power level until one of the cells being monitored is detected to be at or above the upper threshold temperature (e.g., 35° C.), at which point cell discharge is discontinued, and cell stack charging begins. Thus, the length of each discharge 300 may be variable, and is dependent on the monitored cell temperatures during the discharging of power from the cells. Similarly, the length of the charge or rest interval 301 may vary with, for instance, ambient temperature about or within the battery pack system. This discharge and charge process is continued to induce self-heating of the battery pack system to maintain cell temperatures within the desired or optimized battery cell capacity range. As explained herein, the cells are discharged at a specified discharge power level for a short time duration, and a low depth of discharge, in order to keep impact on the battery cell life to a minimum. The discharge/charge induced self-heating is configured to be sufficient to maintain the battery cell stack temperature above a threshold for optimum cell capacity.

Figure 4A:
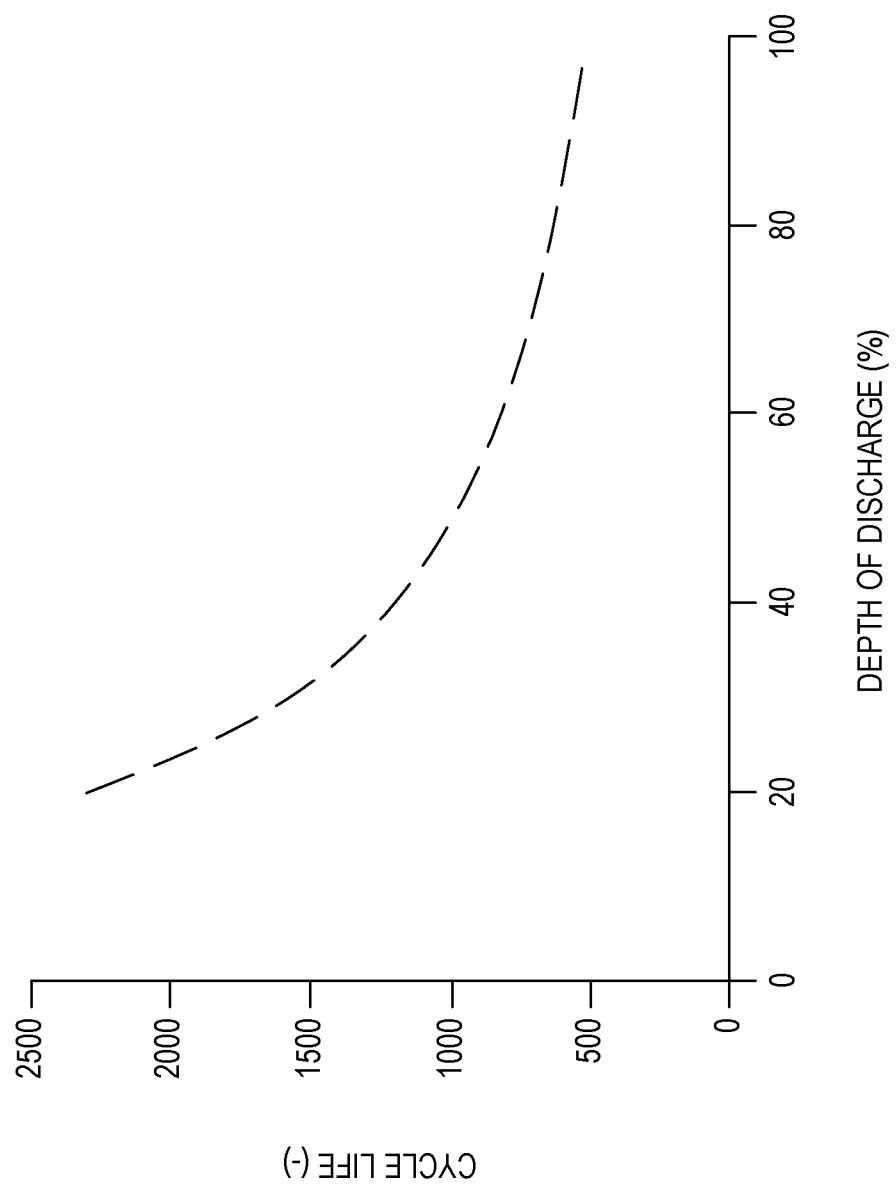
FIG. 4A graphically depicts one embodiment of the relation between life cycle of a battery cell and depth of discharge level, which may be used in determining a discharge power level, in accordance with one or more aspects of the present invention.

FIG. 4A is a graph of the relation between battery cell cycle life and depth of discharge of a rechargeable battery cell. As illustrated, when the battery cell is discharged to a greater extent, the number of discharge/charge cycles possible is reduced, and conversely the cycle life increases with lower depth of discharge levels. Thus, it is desirable to maintain the depth of discharge low when discharging the battery cells in order to minimize the effect on battery pack life. Thus, in one or more aspects disclosed herein, the logic presented seeks to optimize the self-heating discharge of the cells while minimizing depth of discharge, and increasing cycle duration. Depth of discharge refers to the percentage of total battery capacity that is used during a discharge, and cycle duration refers to the time between discharge cycles required to maintain a group of cells within a certain temperature range. Both of these quantities affect the overall life of the cells. The lower the depth of discharge, the less stress on the cells during each cycle. The larger the cycle duration, the fewer the number of times the cells have to be discharged, which also increases the life of the cells.

Dissipation per cell is used herein to refer to how much heat is dissipated while the battery cell is being discharged. Different values of dissipation per cell are achieved by discharging the cells at different power levels (e.g., different current levels). In particular, the discharge power level refers to the power being output by the cell as useful electrical energy, and the dissipation per cell refers to the waste heat being dissipated by the cell as the cell is discharged due to internal resistance. Thus, different dissipation levels can be achieved across different cells, notwithstanding use of the same specified discharge power level since internal resistance may vary between the cells.

The discharge time varies depending upon the ambient temperature, but for a given temperature may be determined as a measure of how long the cell requires to be discharged to bring the cell back into an acceptable temperature range. The depth of discharge may be determined from the discharge power level and the discharge time. The charge time may be determined by the depth of discharge, and measures how long it may take to recharge a cell. Using this information, a charge/discharge ratio may be determined as a ratio of the charge time and the discharge time. An actual charge/discharge time ratio may be the discharge time and cycle duration minus the discharge time. The actual charge/discharge time ratio is required to be larger than the charge/discharge ratio to ensure that the cells have sufficient time to recharge in between discharges. The cycle duration is significant for life optimization. Cycle duration may be based on thermal simulation, or may be determined experimentally, and is a measure of how long battery cells can rest after a charge before the cells need to be discharged again to stay within an acceptable temperature range. The larger the duration, the better for life optimization of the battery cell because the cell life is based on the number of discharges.

Figure 4B:
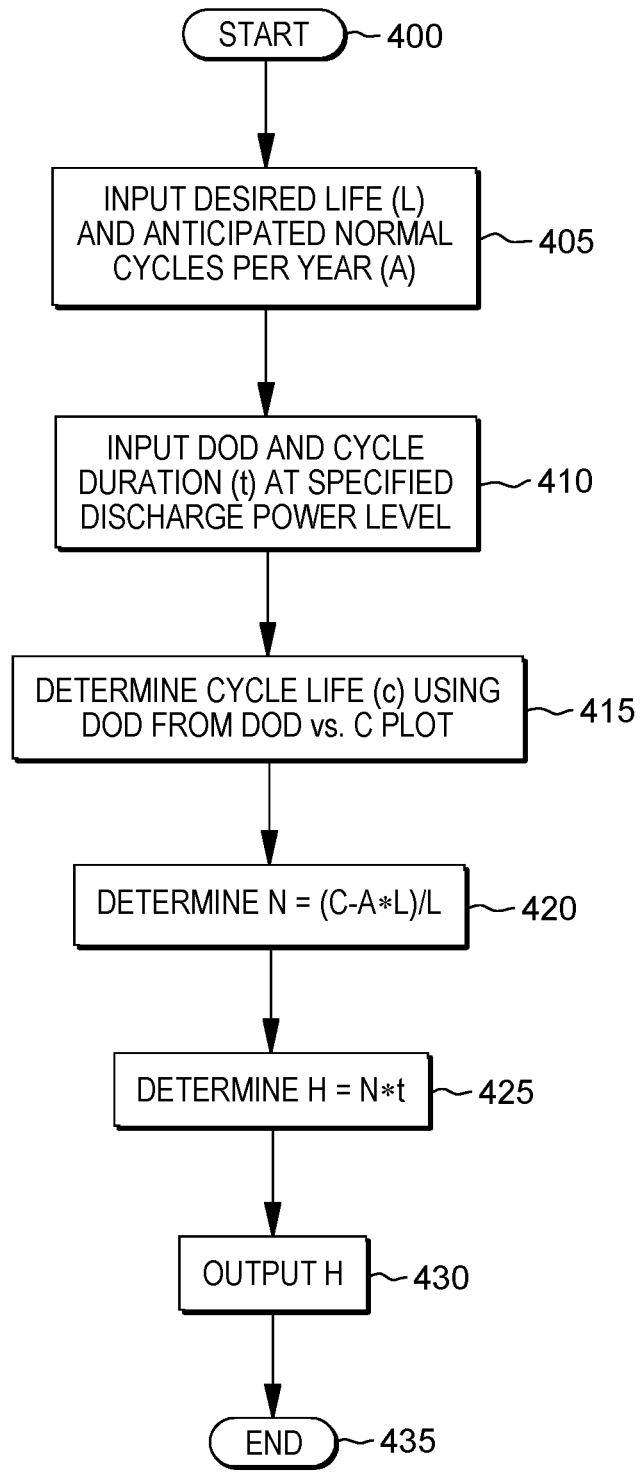
FIG. 4B depicts one embodiment of logic for determining allowable cold hours per year, which may be used in determining a discharge power level, in accordance with one or more aspects of the present invention.

By way of further example, FIG. 4B depicts one embodiment of logic for determining allowable cold hours per year using battery cell capacity optimization via self-regulation of cell temperature, as disclosed herein. The logic begins 400 with receiving a desired life (L) based on requirements for the battery pack, and anticipated number of normal operational cycles per year (A) 405. The depth of discharge (DOD) and cycle duration (t) for a specified discharge power level, of multiple discharge power levels being evaluated, is received 410. Note that the cycle duration can be calculated, simulated or determined empirically. Using a plot of depth of discharge versus battery cell life for the chosen cell, the cycle life may be determined using depth of discharge 415. A determination is then made of the number of cold cycles allowed per year (N), where N=(C−A×L)/L 420, and where C is the total cycle life of a cell in cycles (C), ascertained from the depth-of-discharge. The number of allowable cold hours per year (H) may then be determined as H=N×t 425, and the logic may output the allowable cold hours per year (H) 430 which ends the process 435 for the particular discharge power level of the multiple discharge power levels being evaluated.

Figure 4C:
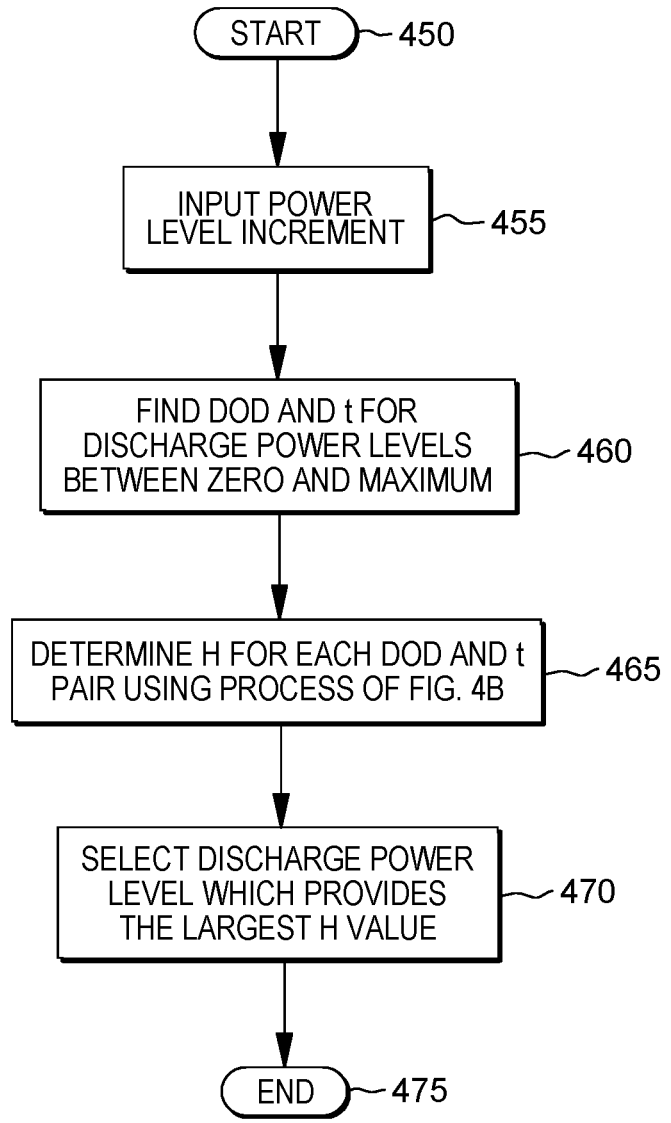
FIG. 4C depicts one embodiment of logic for selecting a discharge power level for battery pack cells, in accordance with one or more aspects of the present invention.

FIG. 4C depicts one embodiment of logic for optimizing the discharge power level. The logic begins 450 with receiving an inputted power level increment 455 for evaluating discharge power levels. Note that smaller increments may provide more precise answers, while larger increments are less time consuming to evaluate in terms of number of possible discharge power levels being considered. Using the power level increment, which defines the number of possible discharge power levels being evaluated, the depth of discharge and cycle duration (t) may be determined for each discharge power level increment between zero and the maximum discharge power level 460. The depth of discharge and cycle duration may be determined via calculations, simulations or empirically, by one skilled in the art, such as described herein. The number of allowable cold hours per year (H) may then be determined for each depth of discharge and cycle time pair using, for instance, the logic of FIG. 4B 465. The discharge power level may then be optimized by finding the power level which provides the highest number of allowable cold hours per year 470, which completes the process 475.

Figure 5A:
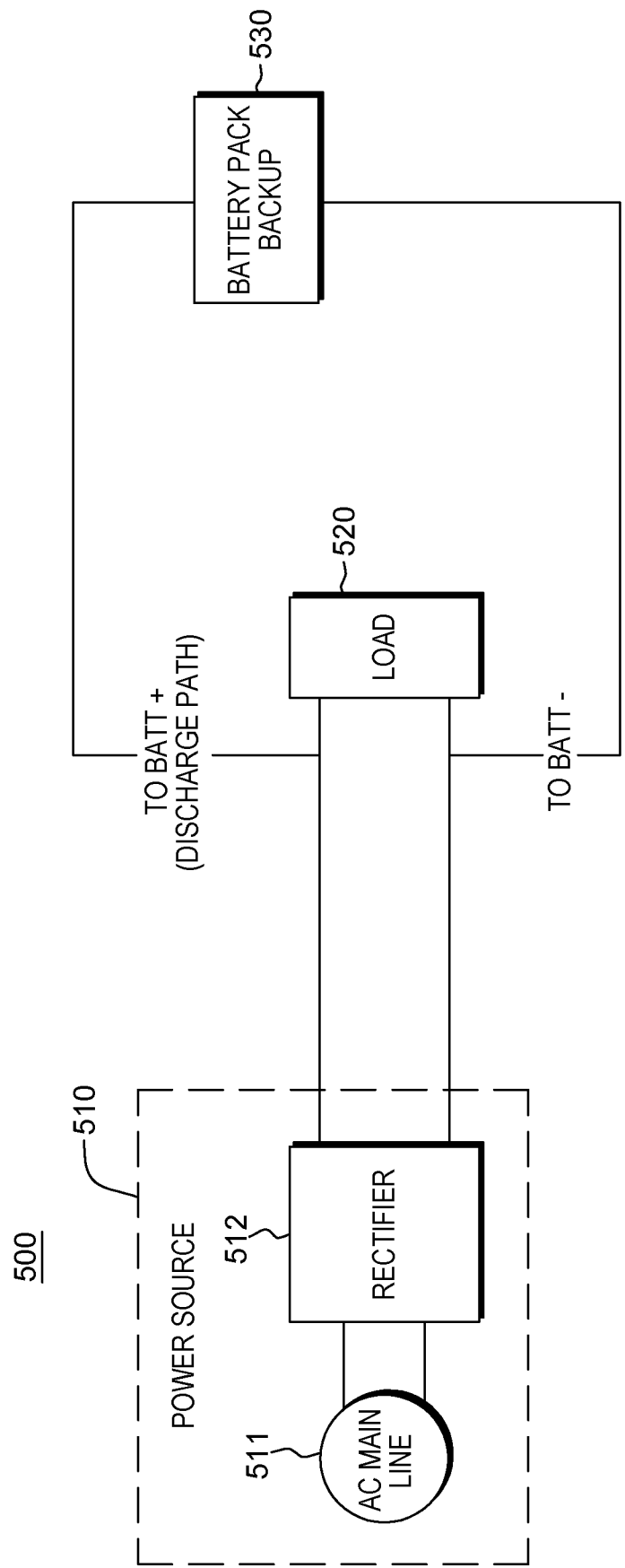
FIG. 5A depicts one embodiment of a system with a battery pack, connected as a battery backup, that is managed for battery cell capacity optimization, in accordance with one or more aspects of the present invention.

FIG. 5A is a schematic of one embodiment of a system 500 which includes a power source 510, a load 520, and a battery pack backup 530. By way of example, the system 500 may be a computing rack, or a component within the computing rack, with battery pack backup 530 providing power to load 520 should power from power source 510 be interrupted. In the embodiment depicted, and by way of example only, power source 510 includes power from an AC main line 511 which is then rectified 512 to provide a desired DC power to load 520.

Figure 5B:
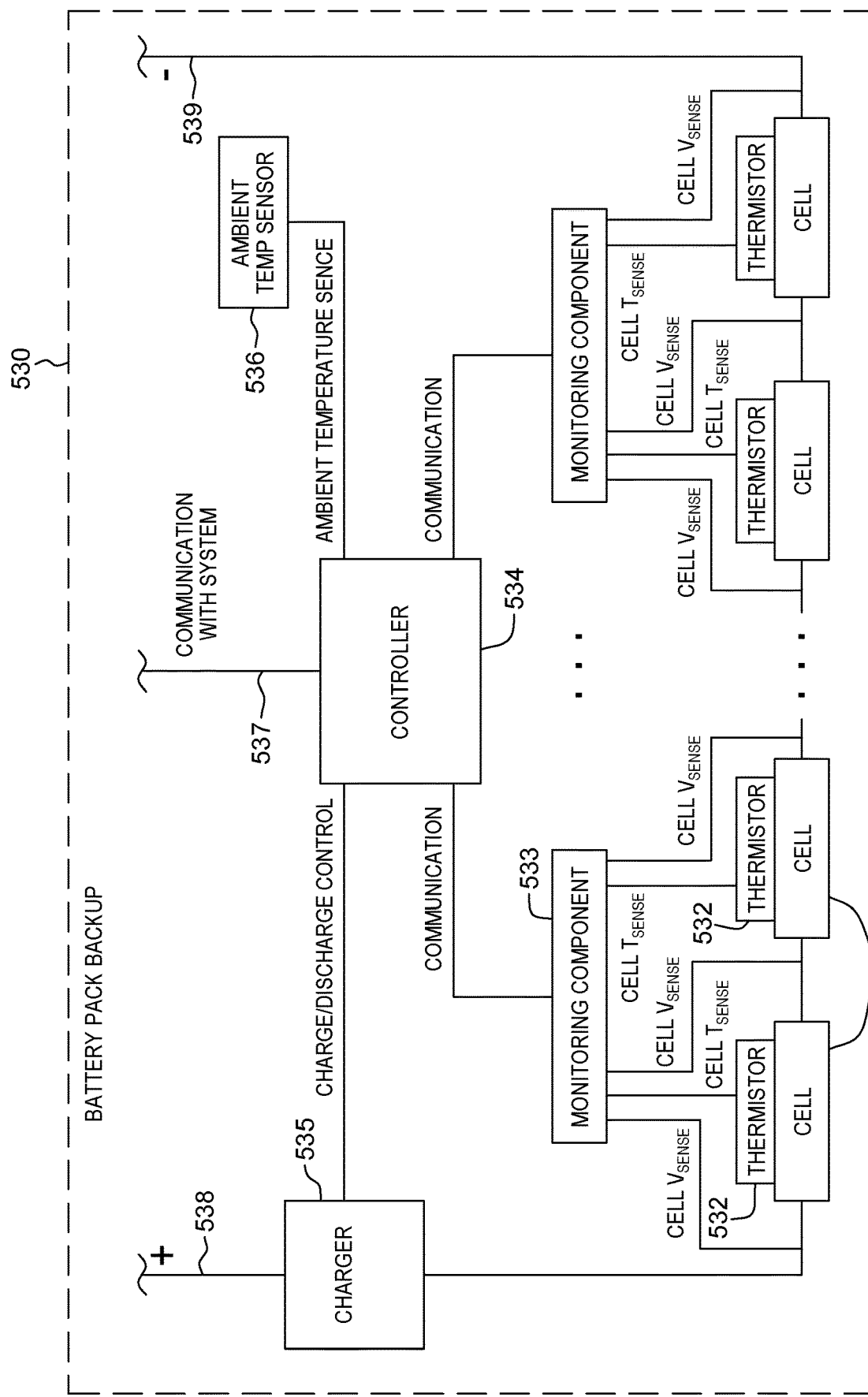
FIG. 5B depicts one embodiment of a battery pack with battery cell capacity management, in accordance with one or more aspects of the present invention.

FIG. 5B depicts one embodiment of battery pack backup 530 which may be used, for instance, in a system such as depicted in FIG. 5A. Note that the battery pack presented as the battery backup is provided by way of example only. The battery pack capacity optimization via self-regulation of cell temperature described herein is applicable to any of a wide variety of battery packs for a wide variety of uses, such as for standby applications, intermittent standby and standalone applications, as well as mostly standalone applications.

In the embodiment of FIG. 5B, battery pack backup 530 is shown to include a plurality of battery cells 531, which are also collectively referred to herein as a cell stack, and each battery cell may include a temperature sensor, such as thermistor 532, associated therewith. As noted, in one or more other embodiments, any subset of the battery cell stack may be temperature monitored, such as every other cell, every third cell, etc. In addition to monitoring or sensing cell temperature, cell voltage may also be sensed. The sensed cell voltages allow the monitoring components and thereby the controller to know what state of charge a cell is in, for instance, for shutting off charging of a cell, and/or for consideration in optimization of cell capacity in a standalone application, such as described herein. Monitoring components 533 are provided to monitor the temperature and voltage across the individual cells in the battery pack. Where the battery cells are lithium-ion battery cells, the monitoring components 533 may be multi-cell lithium-ion battery managers, such as an ISL94212 multi-cell lithium-ion battery manager available from Renesas Electronics Corporation of Tokyo, Japan. The monitoring components 533 are operatively coupled to a controller 534 which implements logic, in accordance with one or more aspects disclosed herein. As shown, controller 534 is coupled to a charger 535 for charge/discharge control, in accordance with aspects of the present invention. Additionally, controller 534 receives ambient temperature readings from one or more ambient temperature sensors 536, and may be in communication with one or more other systems 537, as desired. Power input 538 and power output 539 lines are also provided coupling battery pack backup 530 to an actual load, such as load 520 of system 500 of FIG. 5A.

In operation, the thermal sensors or thermistors 532 provide temperature values back through monitoring components 533 to controller 534, which monitors the cell temperatures within the battery pack, as well as, in one or more embodiments, ambient temperature within or around the battery pack. The controller 534 may initiate discharge of the cells across the actual load when it is determined that one or more of the battery cells are too cold, that is, at a temperature value that is below a specified lower temperature threshold, at which point the controller is configured to take action. Discharging of power across the actual load is advantageous in that it removes the need for additional circuitry or components inside of the battery pack to dissipate the power. As discussed herein, the discharge is a relatively short duration, low power (or current) discharge, in order to keep the impact on cell life to a minimum.

Figure 6:
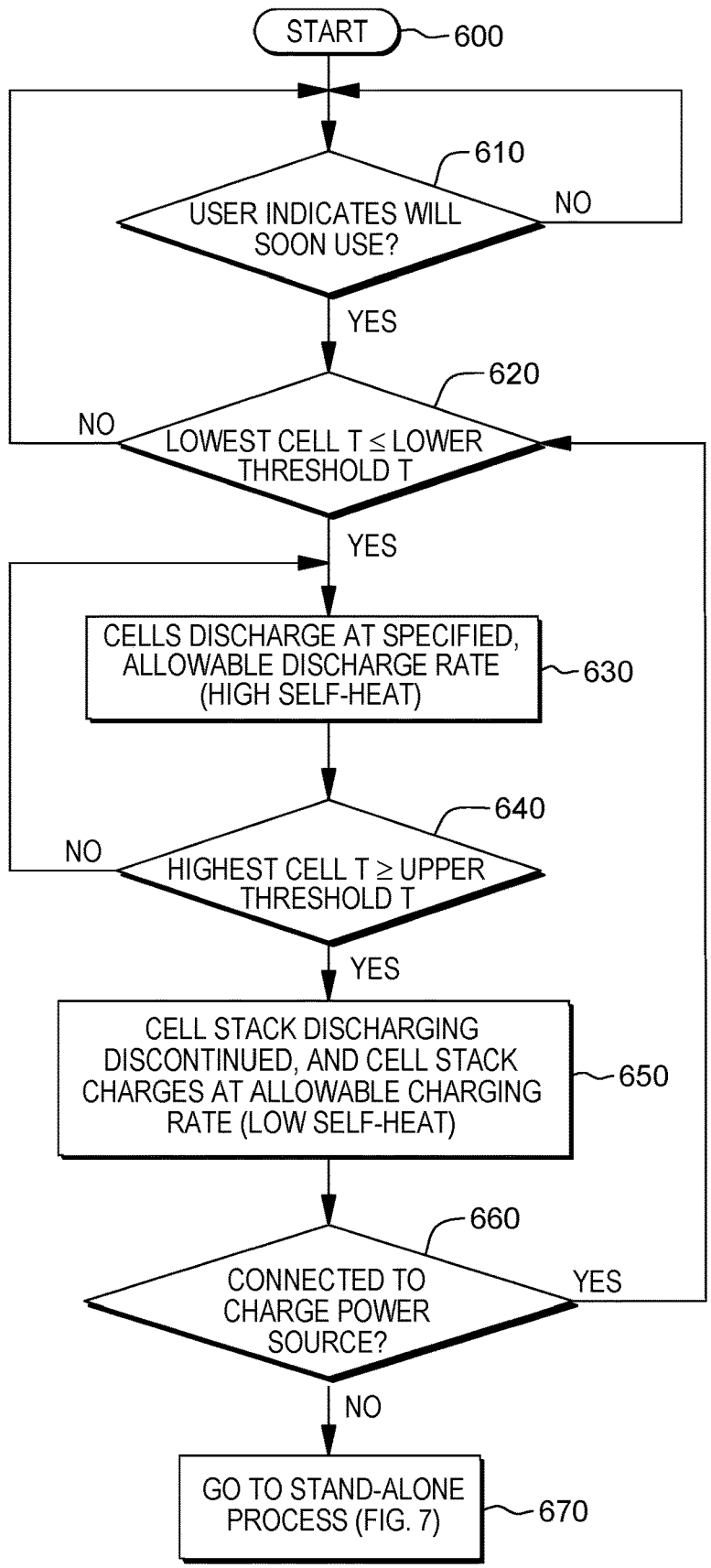
FIG. 6 depicts another embodiment of logic for managing battery cell capacity, in accordance with one or more aspects of the present invention.

FIG. 6 depicts one embodiment of logic for managing or controlling battery pack capacity where the battery pack may be configured at different times in a standby or backup mode, as well as a standalone mode. For instance, the battery pack may be for an electric vehicle or electric forklift that may be connected to a power source for a part of the time, and used separate from the power source at other times. The process begins 600 with a user indicating that the battery pack system will be used, or more generally, the system or load powered by the battery pack is to be used soon, for instance within 30 minutes or less 610. Logic determines whether a battery cell in the battery pack having a lowest cell temperature is at or below a low temperature threshold 620. If no, then no action is taken. Otherwise, the logic discharges the battery cells at the specified, allowable discharge rate 630, to provide a high amount of self-heating of the battery pack. The controller discharges the battery cells at a specified discharge power level predetermined, as described herein, to minimize effect on battery pack life. The discharging of cells continues until one or more of the battery cells is at a temperature that is at or above an upper temperature threshold 640. Once reaching the upper temperature threshold, cell stack discharging is discontinued and cell stack charging is performed at an allowable charging rate 650, which provides a lower amount of self-heating of the battery pack. As part of the discharge charge cycling, logic determines whether the battery pack is still connected to a charge power source, or charger 660. Provided yes, then the logic will loop back to monitor for the lowest cell temperature in the battery pack, otherwise, the controller may rely on standalone processing for optimizing battery pack cell capacity, in accordance with one or more aspects of the present invention. One embodiment of such a standalone process is depicted in FIG. 7.

Figure 7:
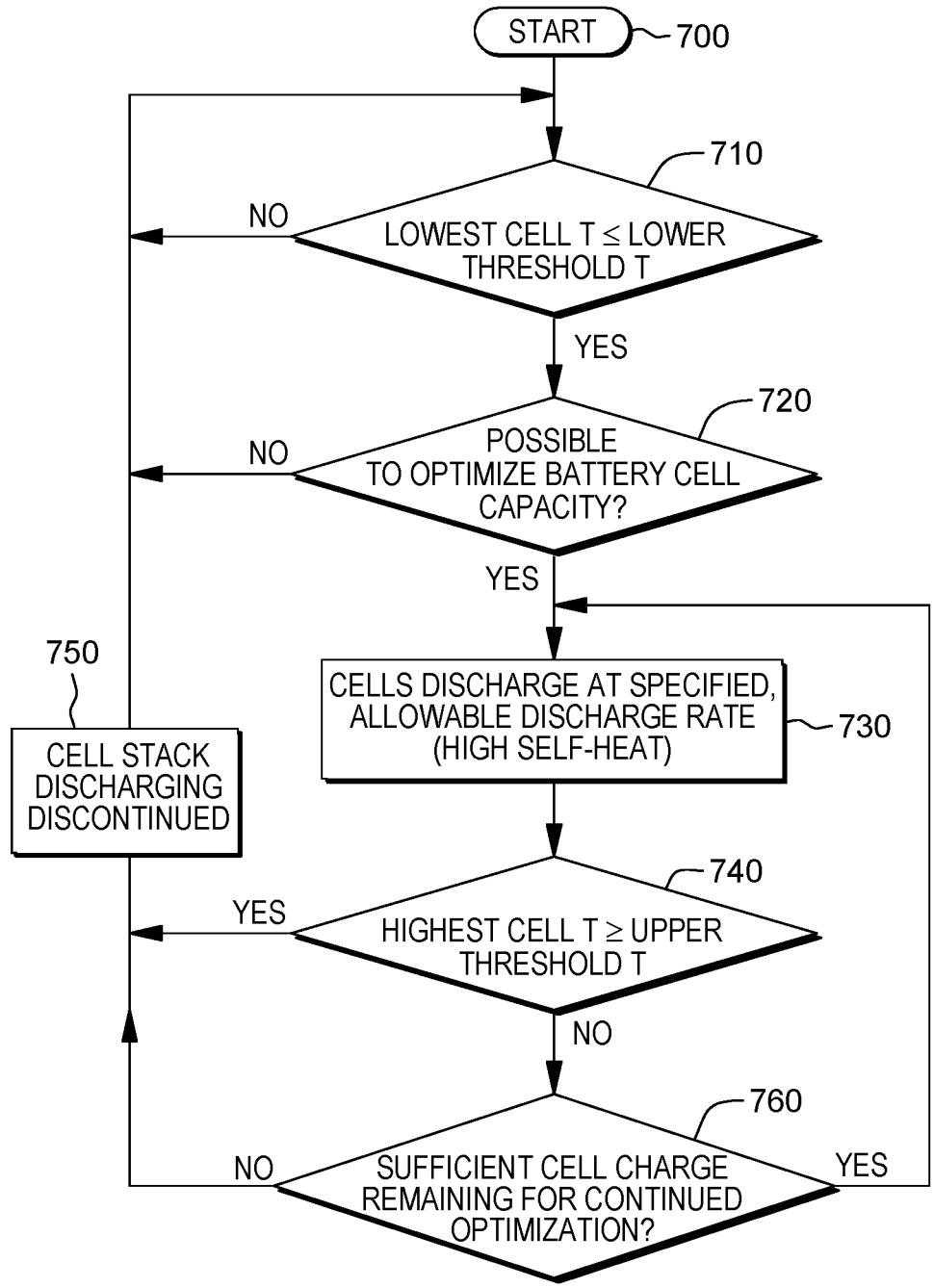
FIG. 7 depicts a further embodiment of logic for managing battery cell capacity, in accordance with one or more aspects of the present invention.

As noted, FIG. 7 depicts one embodiment of logic for optimizing battery pack cell capacity where the battery pack is currently in a standalone application, that is, is not connected a power source or charger. The logic begins 700 with determining whether a monitored cell having a lowest cell temperature is at or below a low temperature threshold 710. If no, then no optimization processing is necessary. If a cell temperature is below the low temperature threshold, or if desired, any combination of cell temperatures is below a specified low temperature threshold, then logic determines whether it is possible to optimize battery cell capacity 720. This may be a check to determine whether there is sufficient charge left in the battery cells in order to perform optimization by charge discharge as described herein. If no, then no action is taken to optimize the battery pack. Otherwise, the cells are discharged at a specified, allowable discharge rate, that is, at the specified discharge power level predetermined as described herein 730. While discharging the cells, logic determines whether one or more of the cells has reached a temperature that is at or above the upper temperature threshold 740, and if so, then cell stack discharging is discontinued 750. Also, while discharging the cells, and assuming that none of the monitored cells has reached a temperature that is at or above the upper temperature threshold, processing may monitor whether there is sufficient charge remaining in the battery cells for continued optimization 760. Those skilled in the art will note that sufficient charge for this purpose means that there is enough charge for self-heating discharge to take place, and afterwards, still sufficient charge to use the device. Essentially, if heating the cells can extend the life of the battery by an amount greater than is used to heat the cell with the self-heating discharge, then optimization is possible. If no, then cell stack discharging is discontinued 750. Otherwise, cell discharging continues at the specified discharge power level.

In the example processing of FIG. 7, optimizing the battery cell capacity may include evaluating and balancing two sets of data. The first set of data may be the general discharge curve at a certain power level, and the other data set may be how much performance of the battery will increase or decrease at a particular temperature. Essentially, the optimization process seeks to determine in this case whether it makes sense to use some of the charge in the battery cells to heat the battery, and thereby gain greater capacity.

Those skilled in the art will note from the description provided herein that certain novel processes are provided to maintain battery pack cells within an acceptable or desirable temperature range for optimized performance. The aspects disclosed avoid the need to overdesign the battery pack to account for reduced cell capacity at lower temperatures, and also do not require the addition of hardware to be added to the battery pack in order to heat the cells. The aspects disclosed herein for monitoring individual cell voltages and temperatures during discharge allows for dynamically accounting for differences in cell strength. For instance, the processing disclosed may account for differences in cell strength that are common with high capacity battery technology, to prevent over discharge of any individual cell in a cell stack. As noted, high capacity battery cells may have different characteristics, especially as they age, that the discharge/charge process may take into account.

One example of a computer system that includes processors that may be used by one or more aspects of the present invention is described with reference to FIG. 8. In this example, the computer system is part of a computing environment including additional components that may or may not be used by aspects of the present invention.

Figure 8:
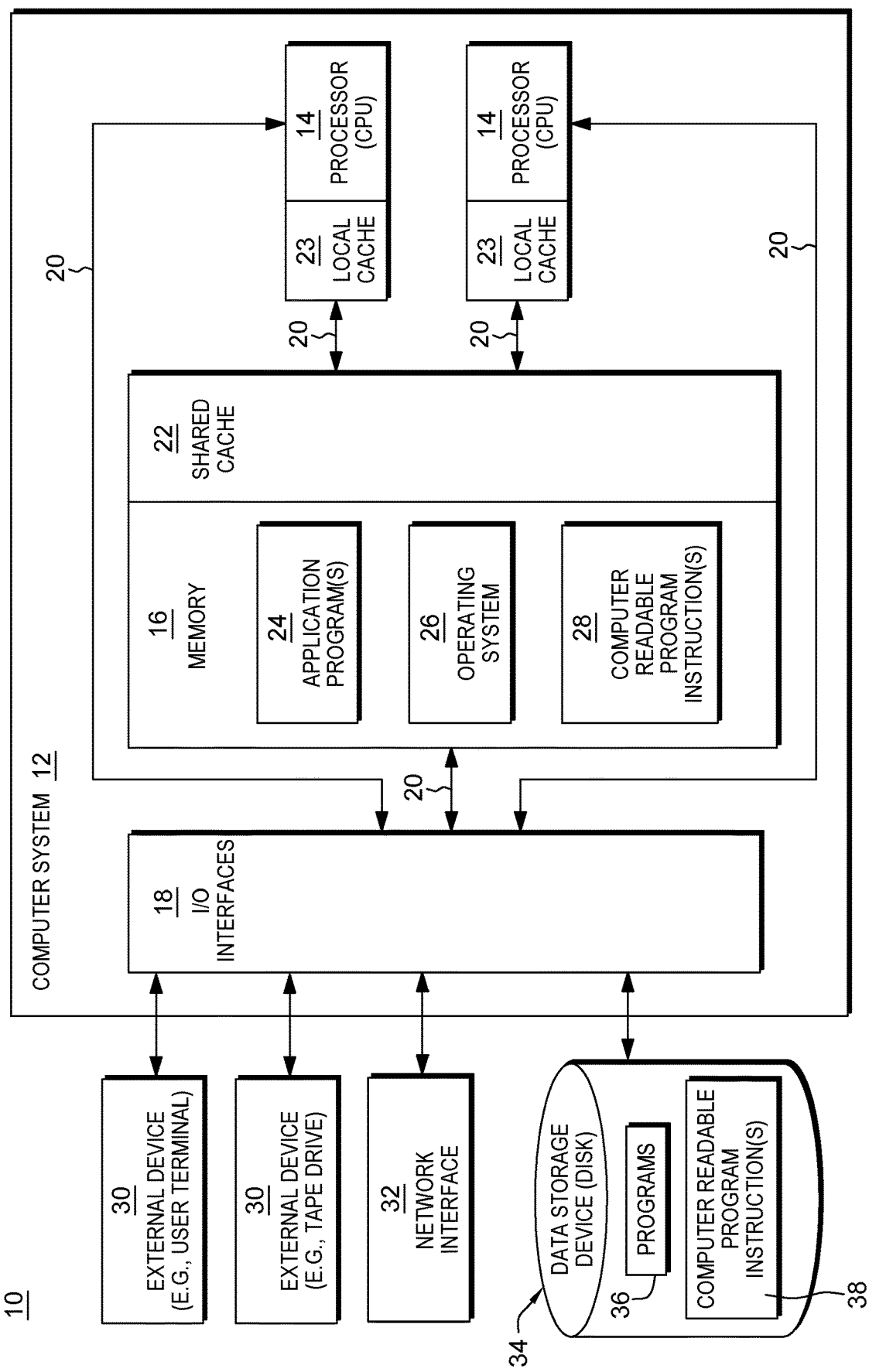
FIG. 8 depicts one embodiment of a computing system which may implement or facilitate implementing one or more aspects of managing battery cell capacity, in accordance with one or more aspects of the present invention.

As shown in FIG. 8, a computing environment 10 includes, for instance, a computer system 12 shown, e.g., in the form of a general-purpose computing device. Computer system 12 may include, but is not limited to, one or more processors or processing units 14 (e.g., central processing units (CPUs)), a memory 16 (a.k.a., system memory, main memory, main storage, central storage or storage, as examples), and one or more input/output (I/O) interfaces 18, coupled to one another via one or more buses and/or other connections 20.

Bus 20 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 16 may include, for instance, a cache 22, such as a shared cache, which may be coupled to local caches 23 of processors 14. Further, memory 16 may include one or more programs or applications 24, an operating system 26, and one or more computer readable program instructions 28. Computer readable program instructions 28 may be configured to carry out functions of embodiments of aspects of the invention.

Computer system 12 may also communicate via, e.g., I/O interfaces 18 with one or more external devices 30, one or more network interfaces 32, and/or one or more data storage devices 34. Example external devices include a user terminal, a tape drive, a pointing device, a display, etc. Network interface 32 enables computer system 12 to communicate with one or more networks, such as a local area network (LAN), a general wide area network (WAN), and/or a public network (e.g., the Internet), providing communication with other computing devices or systems.

Data storage device 34 may store one or more programs 36, one or more computer readable program instructions 38, and/or data, etc. The computer readable program instructions may be configured to carry out functions of embodiments of aspects of the invention.

Computer system 12 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 12. Examples, include, but are not limited to: microcode, device drivers, redundant processing units, external disk drive arrays, RAID systems, tape drives, and data archival storage systems, etc.

Computer system 12 may be operational with numerous other general purpose or special purpose computing system environments or configurations. Examples of well-known computing systems, environments, and/or configurations that may be suitable for use with computer system 12 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In one example, a processor, such as processor 14, may execute one or more components to perform one or more aspects of the present invention. These components may be stored in memory, including main memory (e.g., memory 16) and/or one or more caches (e.g., shared cache 22, local cache 23) and/or external storage (e.g., device 34), and may be executed by one or more processors (e.g., processor 14).

In one example, the components may include a monitoring engine used in monitoring temperature(s); a detection engine used in detecting a particular type of event, such as temperature being at a specified threshold; and an adjustment engine to initiate an action to automatically adjust temperature of the battery pack cells through discharge of power at a specified level. The components executed by a processor may be individual components or combined in one component. Further, other components may be included to perform one or more other tasks. Many variations are possible.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
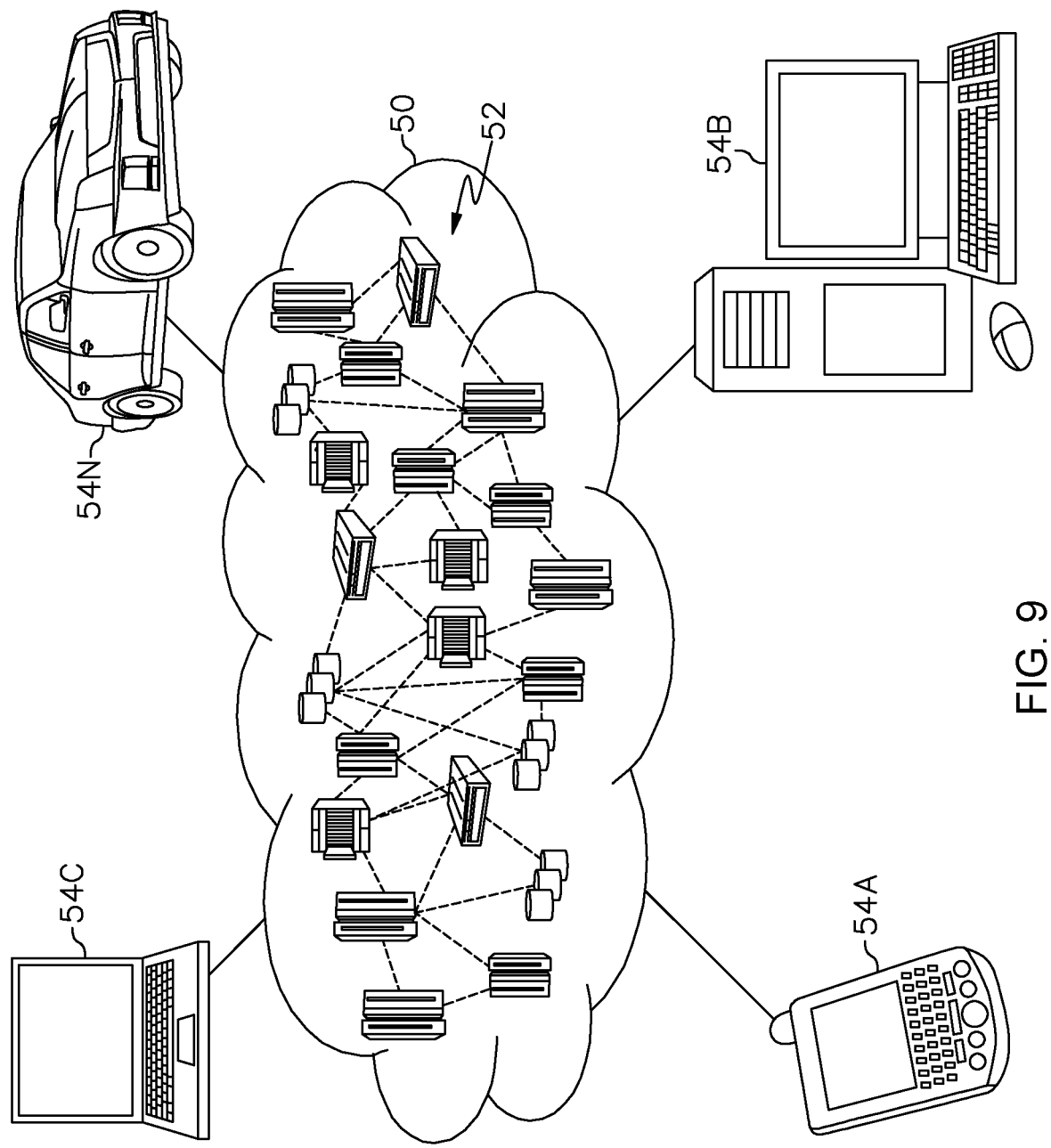
FIG. 9 depicts one embodiment of a cloud computing environment, which may implement, or be used in association with one or more aspects of the present invention.

Referring now to FIG. 9, illustrative cloud computing environment 50 is depicted. As shown, cloud computing environment 50 comprises one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 52 and cloud computing environment 50 can communicate with any type of computerized device over any type of network and/or network addressable connection (e.g., using a web browser).

Figure 10:
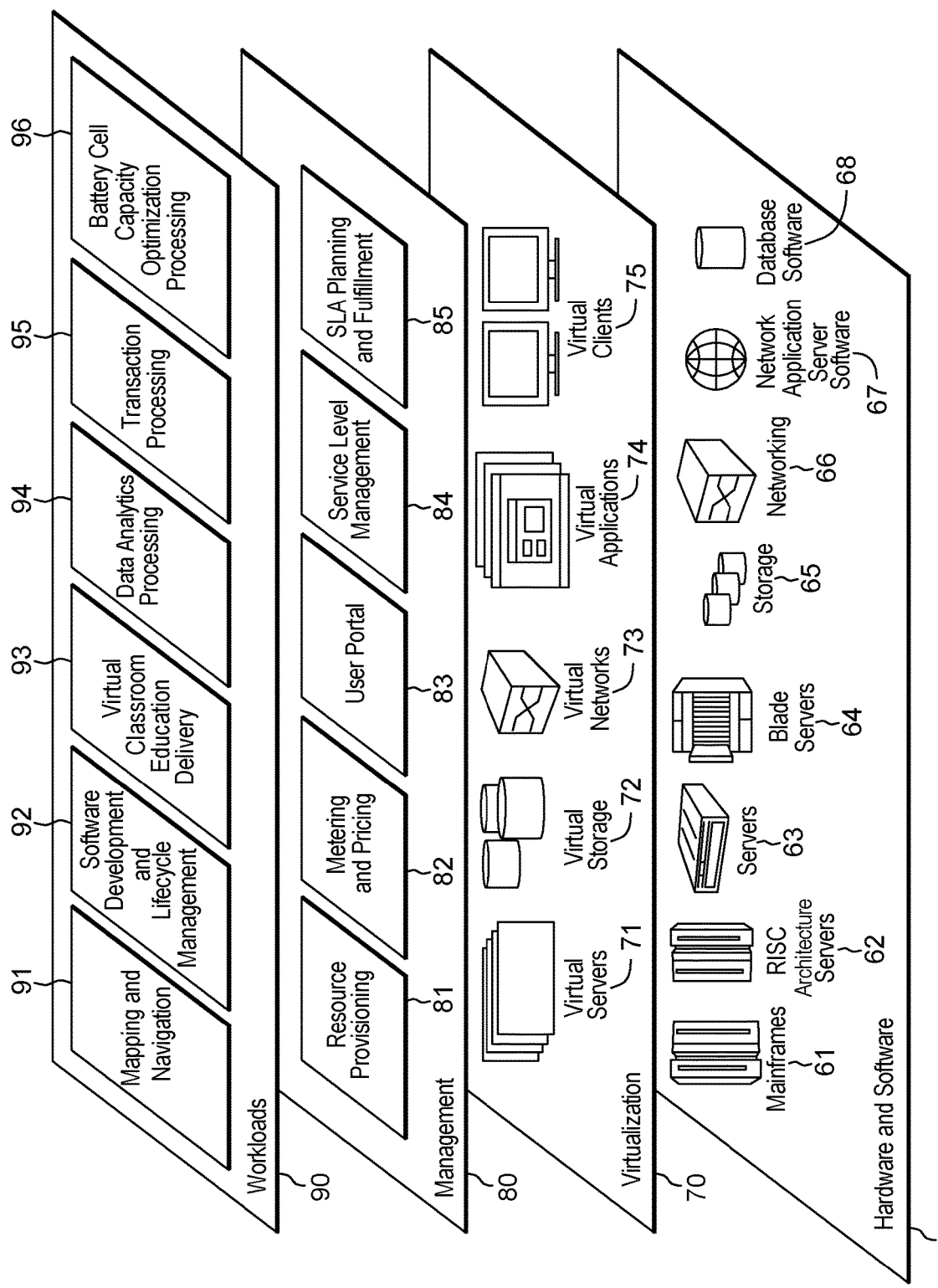
FIG. 10 depicts one example of abstraction model layers, which may facilitate or implement one or more aspects of managing battery cell capacity, in accordance with one or more aspects of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided.

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and battery cell capacity optimization processing 96, which includes, for instance, managing temperature of the battery cells through selective discharge of power from the battery cells.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other types of devices and/or tracking components may be used in one or more embodiments. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method of managing battery pack cell capacity, the method comprising:
    monitoring temperature of one or more cells within a battery pack;
    based on temperature of a cell of the one or more cells being at or below a low temperature threshold, initiating discharging of the one or more cells within the battery pack at a specified discharge power level for the one or more cells to self-heat due to internal resistance;
    based on temperature of a cell of the one or more cells rising to or above an upper temperature threshold after initiating discharging of cells within the battery pack, discontinuing the discharging of the one or more cells within the battery pack; and
    wherein the specified discharge power level is a discharge power level selected to balance minimizing total battery capacity used during the discharging of the one or more cells to self-heat, and increasing time between self-heat discharging of the one or more cells to maintain the one or more cells between the low temperature threshold and the upper temperature threshold, where the balancing minimizes negative effect of the discharging of the one or more cells to self-heat on battery pack life.

2. The method of claim 1, further comprising monitoring ambient temperature about the battery pack, and based on the ambient temperature being at or below a low ambient temperature threshold, determining whether temperature of any cell of the one or more cells is below the low temperature threshold.

3. The method of claim 2, further comprising, based on the discontinuing of discharging of the one or more cells within the battery pack, charging the one or more cells within the battery pack where the battery pack is connected to a power source, and upon completion of the charging of the one or more cells within the battery pack, repeating the monitoring, discharging, discontinuing of discharging and charging to maintain battery pack cell temperature within a desired operational range while the ambient temperature remains at or below the low ambient temperature threshold.

4. The method of claim 1, further comprising specifying the discharge power level to minimize negative effect on battery pack life, the specifying including selecting the discharge power level based on evaluating discharge time, depth of discharge and charge time of multiple discharge power levels on cells within the battery pack.

5. The method of claim 4, wherein the specifying comprises selecting the discharge power level to maximize a number of allowable cold hours per year below the low temperature threshold.

6. The method of claim 1, further comprising receiving an indication that the battery pack may be used within a time interval, and based on receiving the indication, beginning the monitoring of the cell temperature of the one or more cells within the battery pack, and based on temperature of the cell of the one or more cells being at or below the low temperature threshold, initiating discharging of the one or more cells within the battery pack.

7. The method of claim 6, further comprising, based on the discontinuing of discharging of the one or more cells within the battery pack, charging the one or more cells within the battery pack where the battery pack is connected to a power source, and upon completion of the charging of the one or more cells within the battery pack, repeating the monitoring, discharging, discontinuing of discharging and charging to maintain battery pack cell temperature within a desired operational range for the time interval.

8. The method of claim 1, further comprising determining whether battery cell capacity may be optimized based on a charge within the battery cells, and wherein the initiating discharging is further based on determining that battery cell capacity may be optimized based on the charge within the battery cells.

9. The method of claim 8, further comprising during the discharging of the one or more cells within the battery pack, determining whether sufficient charge remains within the battery cells for continued optimization, and based on sufficient charge remaining, continuing with the discharging at the specified discharge power level until the cell of the one or more cells rises to or above the upper temperature threshold, or until insufficient charge remains within the battery cells for continued optimization, and based thereon, discontinuing the discharging of the one or more cells within the battery pack.

10. A system for managing battery pack cell capacity, the system comprising:
    a memory; and
    a processor communicatively coupled to the memory, wherein the system performs a method comprising:
        monitoring temperature of one or more cells within a battery pack;
        based on temperature of a cell of the one or more cells being at or below a low temperature threshold, initiating discharging of the one or more cells within the battery pack at a specified discharge power level for the one or more cells to self-heat due to internal resistance;
        based on temperature of a cell of the one or more cells rising to or above an upper temperature threshold after initiating discharging of cells within the battery pack, discontinuing the discharging of the one or more cells within the battery pack; and
        wherein the specified discharge power level is a discharge power level selected to balance minimizing total battery capacity used during the discharging of the one or more cells to self-heat, and increasing time between self-heat discharging of the one or more cells to maintain the one or more cells between the low temperature threshold and the upper temperature threshold, where the balancing minimizes negative effect of the discharging of the one or more cells to self-heat on battery pack life.

11. The system of claim 10, further comprising monitoring ambient temperature about the battery pack, and based on the ambient temperature being at or below a low ambient temperature threshold, determining whether temperature of any cell of the one or more cells is below the low temperature threshold, and based on the discontinuing of discharging of the one or more cells within the battery pack, charging the one or more cells within the battery pack where the battery pack is connected to a power source, and upon completion of the charging of the one or more cells within the battery pack, repeating the monitoring, discharging, discontinuing of discharging and charging to maintain battery pack cell temperature within a desired operational range while the ambient temperature remains at or below the low ambient temperature threshold.

12. The system of claim 10, further comprising specifying the discharge power level to minimize negative effect on battery pack life, the specifying including selecting the discharge power level based on evaluating discharge time, depth of discharge and charge time of multiple discharge power levels on cells within the battery pack.

13. The system of claim 12, wherein the specifying comprises selecting the discharge power level to maximize a number of allowable cold hours per year below the low temperature threshold.

14. The system of claim 10, further comprising receiving an indication that the battery pack may be used within a time interval, and based on receiving the indication, beginning the monitoring of the cell temperature of the one or more cells within the battery pack, and based on temperature of the cell of the one or more cells being at or below the low temperature threshold, initiating discharging of the one or more cells within the battery pack.

15. The system of claim 14, further comprising, based on the discontinuing of discharging of the one or more cells within the battery pack, charging the one or more cells within the battery pack where the battery pack is connected to a power source, and upon completion of the charging of the one or more cells within the battery pack, repeating the monitoring, discharging, discontinuing of discharging and charging to maintain battery pack cell temperature within a desired operational range for the time interval.

16. The system of claim 10, further comprising determining whether battery cell capacity may be optimized based on a charge within the battery cells, and wherein the initiating discharging is further based on determining that battery cell capacity may be optimized based on the charge within the battery cells.

17. The system of claim 16, further comprising during the discharging of the one or more cells within the battery pack, determining whether sufficient charge remains within the battery cells for continued optimization, and based on sufficient charge remaining, continuing with the discharging at the specified discharge power level until the cell of the one or more cells rises to or above the upper temperature threshold, or until insufficient charge remains within the battery cells for continued optimization, and based thereon, discontinuing the discharging of cells within the battery pack.

18. A computer program product for managing battery pack cell capacity, the computer program product comprising:
a computer readable storage medium having program instructions embodied therewith, the program instructions being executable by a processor to cause the processor to:
monitoring temperature of one or more cells within a battery pack;
based on temperature of a cell of the one or more cells being at or below a low temperature threshold, initiating discharging of the one or more cells within the battery pack at a specified discharge power level for the one or more cells to self-heat due to internal resistance;
based on temperature of a cell of the one or more cells rising to or above an upper temperature threshold after initiating discharging of cells within the battery pack, discontinuing the discharging of the one or more cells within the battery pack; and
wherein the specified discharge power level is a discharge power level selected to balance minimizing total battery capacity used during the discharging of the one or more cells to self-heat, and increasing time between self-heat discharging of the one or more cells to maintain the one or more cells between the low temperature threshold and the upper temperature threshold, where the balancing minimizes negative effect of the discharging of the one or more cells to self-heat on battery pack life.

19. The computer program product of claim 18, further comprising specifying the discharge power level to minimize negative effect on battery pack life, the specifying including selecting the discharge power level based on evaluating discharge time, depth of discharge and charge time of multiple discharge power levels on cells within the battery pack.

20. The computer program product of claim 19, wherein the specifying comprises selecting the discharge power level to maximize a number of allowable cold hours per year below the low temperature threshold.

* * * * *